Figure 1:
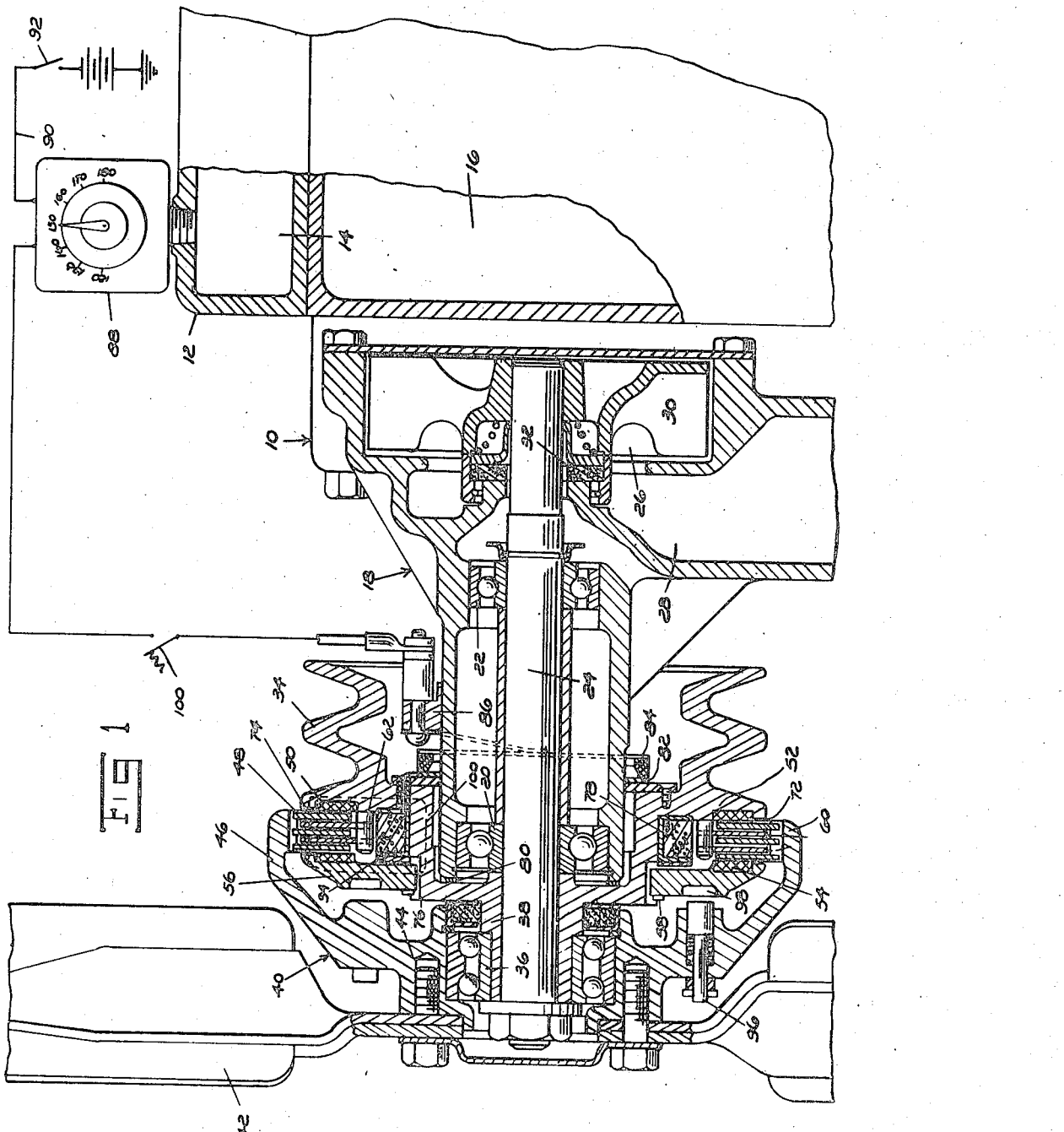

Oct. 26, 1948.    R. C. RUSSELL    2,452,264
COOLING APPARATUS, TEMPERATURE CONTROL
Filed March 31, 1945    2 Sheets-Sheet 2

INVENTOR.
ROBERT C. RUSSELL
BY
McDonald and Teagno
ATTORNEYS

Patented Oct. 26, 1948

2,452,264

UNITED STATES PATENT OFFICE 2,452,264

COOLING APPARATUS, TEMPERATURE CONTROL

Robert C. Russell, Cleveland Heights, Ohio, assignor to Eaton Manufacturing Company, Cleveland, Ohio, a corporation of Ohio Application March 31, 1945, Serial No. 585,992

12 Claims. (Cl. 123—178)

This invention relates to internal combustion engines and more particularly to improved cooling apparatus therefor.

Broadly the invention comprehends a cooling apparatus for an internal combustion engine comprising a fan, and a pump for circulating the cooling liquid, and an electromagnetically controlled disk clutch interposed between the fan and pump for rendering the fan operative or inoperative independent of the pump, said clutch being responsive to the engine temperature.

Heretofore in the construction of cooling apparatus for internal combustion engines, although provision has been made for the thermostatic control of the air circulating fan independent of the engine liquid pump, no practical over-all structure has been devised. The instant invention is aimed at remedying this condition by the provision of a compact, effective, and efficient construction incorporating an electromagnetically operated disk clutch thermostatically controlled for effecting connection and disconnection of the air circulating fan without disruption of the pump operation.

An object of the invention is to provide an engine cooling apparatus effective to maintain the operating temperature of the engine within a predetermined efficient operating range.

Another object of the invention is to provide improved engine cooling apparatus in which the fan operation is connected or disconnected in response to the operating temperature of the engine.

Another object of the invention is the provision of an engine cooling apparatus including an air circulatory fan and a liquid circulatory pump, said fan operation controlled independent of the pump in response to temperature changes in the engine to thus assist in the prevention of formation of low temperature oil sludge in the crankcase.

Another object of the invention is the provision of an engine cooling apparatus provided with suitable controls therefor so as to provide an appreciable horse power savings resulting in economical engine operation for certain phases of operation of the engine.

A further object of the invention is to provide an engine cooling apparatus comprising a liquid pump and fan driven from the same driving means, said fan operation being electromagnetically clutch controlled in response to the engine operating temperature independently of the liquid pump.

A still further object of the invention is the provision of an engine having an electromagnetic disk clutch for driving an engine cooling fan, said clutch being compact in structure, effective in operation, and responsive to the engine operating temperature.

And yet a further object of the invention is the provision of an engine cooling apparatus including an air distributing fan and a liquid circulating pump both operatively connected to a single driving member, said fan being electromagnetically controlled independent of the pump in response to changes in the engine operating temperature.

A further object of the invention is the provision of a compact cooling apparatus comprising an air circulating fan and a liquid circulating pump including a multiple disk clutch electromagnetically actuated thermostatically controlled for controlling the operation of the fan independent of the pump and manually operated means associated with the fan for directly locking the fan to drive means for the fan and pump.

A further object of the invention is the provision of an engine cooling apparatus comprising a pump and a fan, an electromagnetic clutch coupling said fan to said pump, thermostatic means for controlling the clutch operation, and switch means for over-ruling the thermostatic means so as to provide engine horse power saving when desired.

Figure 2:
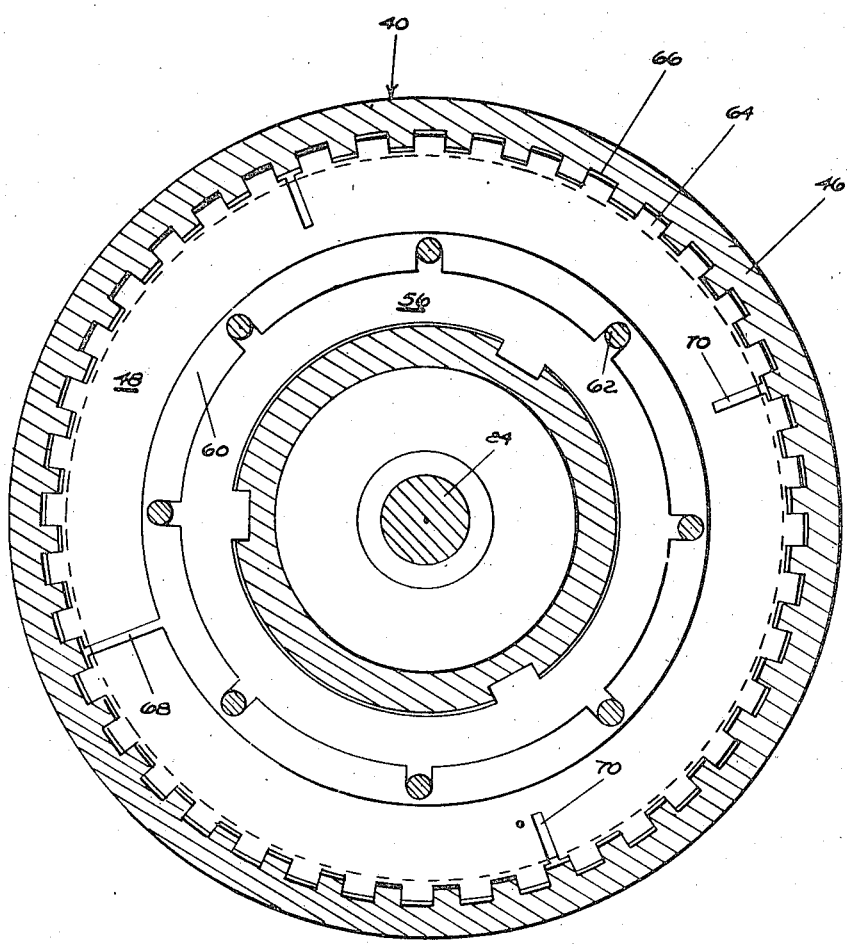

Other objects and advantages of the invention will appear from the following description taken in connection with the drawings forming a part of the specification, and in which:

Figure 1 is a fragmentary side elevational view of an internal combustion engine partly in section embodying the invention; and Figure 2 is a vertical sectional view through line 2—2 of Figure 1.

It has been found most desirable in connection with cooling apparatus for internal combustion engines to provide means for disconnecting the engine fan during certain phases of operation of the engine because of the great power absorbed by the fan at high operating speeds of the engine, and the over-cooling that exists in most phases of engine operation thereby sacrificing efficiency and performance.

The instant invention is premised upon a thermostatically controlled electromagnetically operated disk clutch for controlling the operation of an engine cooling fan, said fan being operable independently of the liquid circulation pump so that the liquid is continually circulated through the engine for the purpose of keeping the engine temperature uniform and provide for the accurate function of the thermostat as well as provide for effective and uniform cooling of the engine block.

By providing for control of the fan operation in response to temperature changes in the engine such that the fan is only driven at such periods that the engine requires additional cooling the possible formation of low temperature oil sludge in the crankcase is minimized. It has been discovered that at peak operating speed of a heavy duty truck or bus engine fan that a driving force of between 9 to 17 horse power is required with the consequent obvious deduction that by shutting off the fan at this speed the vehicle can be more economically operated resulting in increased speed for throttle setting under comparative conditions. As a general rule under ordinary operating conditions, the engine fan cooling operation is required only approximately twenty per cent of the operational time of the engine with which it is associated. Furthermore upon starting up a vehicle engine wherein the fan is disconnected from operation due to the unheated condition of the engine, the engine is able to be more quickly brought up to efficient operating speed thereby resulting in more economical operation of the engine. Additionally in view of the small operational time of the fan, it is permissible to increase the diametrical size of the fan so that the fan is capable of extreme cooling requirements.

This cooling apparatus employs a single drive means having a direct drive connection with a liquid circulatory pump and clutch connection with the air circulating fan, said clutch being in the form of a multiple disk electromagnetically operated mechanism controlled by a thermostatic switch responsive to a predetermined engine operating temperature. Because of the effective magnetic circuit provided by the arrangement of the disks and the electromagnet incorporated in the clutch, a very low amperage is drawn from the electrical power source; and furthermore the number of disks can be multiplied to lessen the unit pressure on the engaging faces of the disks without increasing the current drawn, thereby increasing materially the over-all life of the disks.

Referring to the drawings for more specific details of the invention, 10 represents generally an automobile cylinder block and 12 a cylinder head provided with suitably intercommunicated liquid passages 14 and 16.

A housing 18 suitably secured on the front end of the cylinder has mounted therein bearings 20 and 22 adapted to support a rotatable shaft 24 and provides a pump chamber 26 having an interconnected passageway 28 adapted to provide communication with a water cooling radiator, not shown, by suitable conduit, not shown.

The shaft 24 has a pump impeller 30 secured thereto within the pump chamber, said pump chamber having a suitable seal 32 mounted between the shaft and housing 18 to inhibit seepage of liquid from the chamber. Fixedly secured at the other end of the shaft 24 is a V-belt pulley 34 adapted to be driven from a suitable power source, not shown, said pulley in turn having a bearing 36 mounted on a hub 38 thereof.

Journaled on the bearing 36 in concentric relationship to the shaft 24 is a member 40 mounting an engine cooling fan 42 and including a hub section 44 and rim section 46. The rim 46 supports on splines thereof for limited axial movement relative thereto disks 48, the end ones of which are adapted to respectively cooperate with a friction lining 50 supported on end face 52 on pulley 34 and a friction lining 54 supported on an end plate 56 slidably splined on pulley hub 38 and held thereon by snap ring 58. Discs 60 alternately interposed between the disks 48 and adapted to cooperate therewith are splined axially slidable upon pins 62 fixed to end face 52 of pulley 34.

The driven disks 48 are provided with fingers 64 received in close conformity by axial splines 66 in rim 46 of member 40 and each has a single radial slot 68 throughout the radial width of the disks and a number of equi-spaced radial slots 70 across a substantial portion of the radial width of the disks. The disks 48 are slotted as at 68 and 70 so that in the assembly thereof upon the splines 66 the fingers 64 will resiliently hold the disks in desired position and furthermore so that when moved axially away from disks 60 upon the disengagement of the clutch will assume a position spaced from the disks 60 and thereby minimize any tendency of drag between the plates 48 and 60. The friction linings 50 and 54 respectively supported on end face 52 of pulley 34 and plate 56 extend a distance 72 beyond the faces thereof and as such constitute the predetermined allowable friction lining wear, said spaces constituting air gaps 74 tending to disrupt any flow of residual magnetism and thus assist in releasing drag of the plates when disengaged. The hub 38 is copper plated at 76 for the purpose of providing an additional barrier to the flow of residual magnetism.

As a means of providing resilient holding engagement of the disks 48 upon the splines 66 of the member 40 they are initially slotted as indicated at 68 and 70, then spread radially thus increasing the over-all diameter thereof, and thence radially compressed so as to be resiliently received by the splines 66.

A magnetic coil 78 wound in the hub of the pulley 34 located inward radially disposed from the disks 48 and 60 has one end grounded through the hub 38 thence through bronze wave ring 80 to the housing 18 and its other end connected to a copper or other suitable material contactor plate or pick-up band 82 insulatedly mounted on the pulley. The wave ring 80 provides a direct path for the grounding of the coil 78. A spring pressed contactor ring 84 supported by an insulated housing 86 upon the housing 18 bears upon the pick-up band 82 and is connected to a thermostatic switch 88 mounted in the cylinder head 12. The thermostatic switch in turn is connected to a battery or other suitable electric current 90 controlled as by a switch 92, such as the ignition switch of the engine.

The exposed face of plate 56 extending beyond the lining 54 and the face 52 of pulley 34 extending beyond the lining 50 constitute the pole faces of the magnetic circuit.

A wave spring 94 interposed between the end plate 56 and side wall of coil 78 assists in returning end plate 56 to normal position upon disengagement from the disks.

For the purpose of providing the most effective flow of flux lines, the disks 48 and 60 possess characteristics of magnetic conductivity and have faces of high wear resistance, the pins 62 are of non-magnetic material so as not to divert any of the flux lines away from their path of flow and likewise the rim 46 is made from material having non-magnetic properties.

As a safety factor should the electromagnetic clutch fail, spring pressed pins 96 are provided in the hub 44 adapted to engage suitable slots or recesses 98 in the end plate 56 so as to effect a direct locking engagement between the pulley 34 and fan 42.

When with the fan in operation as controlled by the thermostatic switch it is desired to increase the motive power a spring loaded switch 100 mounted in the circuit between the clutch and the thermostatic switch is tripped to shut off the current supply to the clutch thus over-ruling the thermostatic switch.

In a normal operation of the cooling apparatus with the engine cold, upon turning on the ignition switch 92 and starting the engine the V-belt pulley 34 is suitably driven from the engine resulting in rotating the shaft 24 and pump impeller 30 thus providing for the circulation of liquid through the circulating system of the engine thereby providing for uniform heating of the liquid throughout the cylinder block and head.

During the initial heating of the liquid, the thermostat switch remains in open circuit position with the result that the clutch is not energized and the fan remains inoperative. When the liquid reaches a predetermined temperature as determined by the thermostat switch setting, the thermostat responds to the liquid temperature thus closing the circuit and providing for flow of current to the coil through contactor 84 and band 82 resulting in energization of the coil 78. Upon energization of the coil a magnetic flux is generated as indicated by dotted line 102 causing attraction between the metallic exposed faces respectively of the plate 56 and pulley 34; and since plate 56 is free to move axially as are disks 48 and 60, the attraction between the poles forces the plate, disks, and pulley into a driving contact thereby providing for transmission of torque from pulley 34 to member 40 resulting in driving the fan. It is to be observed from the arrangement of disks between the pole faces and the path of magnetic flux as shown by the drawing that each disk carries substantially the same amount of torque since the flux lines must pass through each successive disk to complete its circuit without short circuiting.

During the flow of magnetic flux, the copper plate 76 on pulley 34 provides a mere infinitesimal barrier to the flow and as such has no material bearing upon efficient clutch pack-up; but when the coil is de-energized, it becomes an effective barrier to the flow of residual magnetism and assists the air gaps 74 in eliminating any drag on the clutch plates that such residual magnetism tends to produce.

Upon the attainment of a liquid temperature in the engine in accordance with the thermostat setting, the switch associated therewith is actuated to break the electrical circuit resulting in de-energizing the coil.

The disks 48 and 60 upon de-energization of the coil, which in effect unloads said disks, will again assume normal positions between the respective faces thereof and pole faces with corresponding free running clearances therebetween so as to permit free running of the pump independent of its fan. With the return of the disks and pole faces to normal position, a cycle of operation of the fan drive is completed.

While this invention has been described in connection with certain specific embodiments, the principle involved is susceptible of numerous other applications that will readily occur to persons skilled in the art. The invention is, therefore, limited only as indicated by the scope of the appended claims.

What I claim is:

1. In combination with an internal combustion engine a cooling system comprising a pump for circulating liquid through the engine, a fan, a driving source for the pump and fan, a member driven from the driving source for direct connection with the pump and electromagnetic disk clutch connection with the fan, said clutch connection being arranged in telescoping relationship to the pump connection, and engine temperature responsive means for controlling the electromagnetic clutch operation.

2. In a combination with an internal combustion engine, a cooling system comprising a pump for circulating liquid through the engine, a fan for circulating air, a drive source for the pump and fan, a pulley driven from the driving source, a shaft coupling the pulley to the pump, an electromagnetic disk clutch telescoping the pump shaft coupling the pulley to the fan, an electric circuit for energizing said clutch, and means responsive to changes in the operating temperature of the engine for controlling the energization of the clutch.

3. In combination with an internal combustion engine a cooling system comprising a pump for circulating liquid through the engine, a fan circulating air, driving means for the pump and fan, a pulley driven from the driving means, a shaft connecting said pulley to the pump, a magnetic coupling interposed between the fan and pulley in telescopic relationship to the pump shaft, said coupling comprising an annular electromagnet mounted on the member, a plurality of normally spaced axially movable disks, a plate or plates axially movable on the member, an electric circuit for energizing the clutch, means providing impedance to the flow of residual magnetism when the electromagnet is de-energized, and means for controlling the operation of the clutch.

4. In combination with an internal combustion engine a cooling system comprising a pump for circulating liquid through the engine, a fan for circulating air, a drive source for the pump and fan, a pulley driven from the driving source, a shaft connecting the pulley to the pump, a magnetic coupling interposed between the fan and pulley in telescopic relationship to the pump shaft, an electric circuit for energizing the coupling, an engine temperature responsive means for controlling the circuit, said coupling comprising a plurality of axially movable disks, some carried for rotation with the member and others carried for rotation with the fan, an end plate rotated with the member and axially shiftable thereon, and means interposed between the end plate and member for assisting in immediately relieving the drag between the disks upon de-energization of the coupling.

5. In combination with an internal combustion engine, a cooling system comprising a pump for circulating liquid through the engine, an air circulating fan, a drive means for the pump and fan, a pulley driven from the driving source, a shaft coupling the pulley to the pump, an electromagnetic clutch telescoping the pump shaft coupling the pulley to the fan, an electric circuit for energizing said clutch, and means responsive to changes in the operating temperature of the engine for controlling the energization of the clutch, said clutch comprising an annular electromagnet mounted in the pulley, a plurality of disks outward radially disposed of the electromagnet some secured for rotation with the pulley and the others with the fan, an end plate constituting a magnetic pole relatively axially movably mounted on the pulley, a portion of the pulley constituting the other pole face of the clutch, and means within the magnetic flux circuit for substantially reducing residual magnetism, and thereby prevent drag between the disks upon de-energization of the coupling.

6. An engine cooling apparatus comprising a liquid pump, a fan, means for driving the pump and fan, thermostatically controlled electromagnetically operated means for controlling the operation of the fan indepedent of the pump, and auxiliary manually actuated means for locking the fan to the pump.

7. An engine cooling apparatus comprising a liquid circulatory pump, an air circulatory device, means driven from the engine for driving the pump and device, thermostatically controlled electromagnetic means for controlling the drive to the device so as to provide for the operation of the pump independent of the device, and auxiliary manually actuated means for locking the fan to the pump.

8. In combination with an internal combustion engine, a cooling system comprising a pump and a fan, a power take-off from the engine for driving the pump and fan, an electromagnetically actuated clutch, said clutch comprising a number of disks connected to the fan and a number of disks connected to the pump alternately interposed between the disks on the fan, the disks on one of the members having radial fingers engaging said member and means providing for the locating of these disks spaced from the other disks when disengaged from the other disks, and thermostatic means associated with the engine for controlling the operation of the clutch.

9. In combination with an internal combustion engine, a cooling system comprising a pump and a fan, a power take-off from the engine for driving the pump and fan, an electromagnetically actuated clutch, said clutch comprising a number of disks connected to the fan and a number of disks connected to the pump alternately interposed between the disks on the fan, the disks on one of the members having means incorporated therein providing for the resilient spacing of these disks from the other disks upon the disengagement therefrom, and thermostatic means associated with the engine for controlling the operation of the clutch.

10. In an internal combustion engine a power source driven from the engine, a plurality of engine cooling devices driven from the power source, electromagnetically actuated disk clutch means for controlling the operation of one of the cooling devices, electrical power source for energizing the electromagnetic clutch, thermostatic means associated with the engine interposed in the electrical power source for controlling the clutch operation, and a switch interposed between the clutch and the thermostatic means in the electrical power source for overruling the thermostatic control means.

11. In an internal combustion engine, cooling means for the engine, means for driving said cooling means, electromagnetic clutch means interposed between the cooling means and driving means for controlling operation of the cooling means comprising clutch engaging surfaces, an electromagnetic coil radially inwardly disposed adjacent to the engaging clutch surfaces providing for the flow of magnetic flux in a single path or circuit through the engaging clutch surfaces and around the coil, and an electric circuit for energizing the coil and means in the engine associated with the electric circuit responsive to the changes in the temperature of the engine for controlling operation of the clutch.

12. In an internal combustion engine, rotary cooling means for the engine, a power driving means for said cooling means, an electromagnetic clutch coupling the driving means to the cooling means and comprising clutch engaging members arranged respectively on non-magnetic portions of the cooling and driving means, an electromagnetic coil secured on the driving means radially inwardly disposed from the clutch engaging members, and an electric circuit for energizing the coil and thermostatic means responsive to changes in the operating temperature of the engine for controlling energization of the clutch.

ROBERT C. RUSSELL.

REFERENCES CITED

The following references are of record in the file of this patent:

UNITED STATES PATENTS

| Number | Name | Date |
| --- | --- | --- |
| Re. 9,823 | Fish | July 26, 1881 |
| 439,213 | Veeder | Oct. 28, 1890 |
| 586,664 | Huber | July 20, 1897 |
| 762,622 | Eastwood | June 14, 1904 |
| 828,647 | Gibbs | Aug. 14, 1906 |
| 1,481,306 | Stuart | Jan. 22, 1924 |
| 1,481,307 | Stuart | Jan. 22, 1924 |
| 1,760,174 | Schunemann | May 27, 1930 |
| 1,787,225 | Wittkuhns | Dec. 30, 1930 |
| 1,820,035 | Stokes | Apr. 25, 1931 |
| 1,837,564 | McCaleb | Dec. 22, 1931 |
| 1,900,586 | Rippe | Mar. 7, 1933 |
| 1,921,042 | Roos | Aug. 8, 1933 |
| 1,934,783 | Arterburn | Nov. 14, 1933 |